US012033395B2

(12) United States Patent
Sasamoto et al.

(10) Patent No.: US 12,033,395 B2
(45) Date of Patent: Jul. 9, 2024

(54) OBJECT DETECTION DEVICE, TRAVEL CONTROL SYSTEM, AND TRAVEL CONTROL METHOD

(71) Applicant: Hitachi Astemo, Ltd., Hitachinaka (JP)

(72) Inventors: Manabu Sasamoto, Chiyoda-ku (JP); Shigeru Matsuo, Chiyoda-ku (JP); Kentarou Ueno, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 345 days.

(21) Appl. No.: 17/596,873

(22) PCT Filed: May 25, 2020

(86) PCT No.: PCT/JP2020/020489
§ 371 (c)(1),
(2) Date: Dec. 20, 2021

(87) PCT Pub. No.: WO2021/059589
PCT Pub. Date: Apr. 1, 2021

(65) Prior Publication Data
US 2022/0319186 A1    Oct. 6, 2022

(30) Foreign Application Priority Data

Sep. 27, 2019  (JP) .................................. 2019-177661

(51) Int. Cl.
*G06V 20/58* (2022.01)
*G05D 1/00* (2006.01)
(Continued)

(52) U.S. Cl.
CPC .......... *G06V 20/58* (2022.01); *G05D 1/0295* (2013.01); *G06T 7/593* (2017.01); *G06T 7/70* (2017.01);
(Continued)

(58) Field of Classification Search
CPC .. G06V 20/58; G06V 2201/08; G05D 1/0295; G06T 7/593; G06T 7/70;
(Continued)

(56) References Cited

U.S. PATENT DOCUMENTS

| 9,927,816 B2 * | 3/2018 | Li ........................ G05D 1/0295 |
| 2016/0161271 A1 * | 6/2016 | Okumura .............. B60W 30/09 |
| | | 701/25 |

(Continued)

FOREIGN PATENT DOCUMENTS

| JP | 9-272414 A | 10/1997 |
| JP | 2013-242737 A | 12/2013 |

(Continued)

OTHER PUBLICATIONS

International Search Report (PCT/ISA/210) issued in PCT Application No. PCT/JP2020/020489 dated Aug. 18, 2020 with English translation (five (5) pages).

(Continued)

*Primary Examiner* — Carol Wang
(74) *Attorney, Agent, or Firm* — Crowell & Moring LLP

(57) ABSTRACT

A problem of the present invention is to provide an object detection device etc. that can accurately detect an object regardless of a view angle position of and distance to the object. An object detection device of the present invention has: a stereo distance detection portion 105 that detects a distance to an object; a position detection portion 106 that detects a position of the object; a pose detection portion 111 that detects a pose of the object; a vehicle information input portion that inputs state information about a host vehicle and a different vehicle; a position prediction portion 109 that predicts a position of the different vehicle based on the state information about the host vehicle and the different vehicle; a pose prediction portion 110 that predicts a pose of the (Continued)

different vehicle based on the state information about the host vehicle and the different vehicle; and a determination portion 112 that determines a distance to, a position of, and a pose of the different vehicle in response to the information detected or predicted by the distance detection portion, the position detection portion, the pose detection portion, the position prediction portion, and the pose prediction portion.

9 Claims, 12 Drawing Sheets

(51) Int. Cl.
    *G06T 7/593*     (2017.01)
    *G06T 7/70*     (2017.01)
    *B60W 60/00*     (2020.01)
    *G08G 1/16*     (2006.01)

(52) U.S. Cl.
    CPC ..... *B60W 60/001* (2020.02); *B60W 2420/403* (2013.01); *B60W 2554/4041* (2020.02); *B60W 2554/802* (2020.02); *G06T 2207/30241* (2013.01); *G06T 2207/30252* (2013.01); *G06V 2201/08* (2022.01); *G08G 1/16* (2013.01)

(58) Field of Classification Search
    CPC ................. G06T 7/0002; G06T 7/246; G06T 2207/30241; G06T 2207/30252; G06T 2207/10021; G06T 2207/10024; G06T 2207/30261; G06T 2207/30256; B60W 60/001; B60W 2420/403; B60W 2554/4041; B60W 2554/802; B60W 2554/20; B60W 2554/806; B60W 40/02; B60W 30/16; B60W 30/10; G08G 1/16; G08G 1/04; G08G 1/166

See application file for complete search history.

(56) References Cited

U.S. PATENT DOCUMENTS

| | | | |
|---|---|---|---|
| 2017/0242443 A1* | 8/2017 | Schuh | G08G 1/163 |
| 2018/0148050 A1* | 5/2018 | Katou | G08G 1/163 |
| 2019/0251845 A1* | 8/2019 | Kosaka | G08G 1/166 |
| 2020/0017106 A1* | 1/2020 | Park | B60W 10/04 |
| 2020/0114916 A1* | 4/2020 | Oguro | B60W 30/08 |

FOREIGN PATENT DOCUMENTS

| | | | | |
|---|---|---|---|---|
| JP | 2018-97644 A | | 6/2018 | |
| JP | 2019049812 A | * | 3/2019 | |
| WO | WO-2019058755 A1 | * | 3/2019 | ............... G01C 3/06 |

OTHER PUBLICATIONS

Japanese-language Written Opinion (PCT/ISA/237) issued in PCT Application No. PCT/JP2020/020489 dated Aug. 18, 2020 (three (3) pages).

* cited by examiner

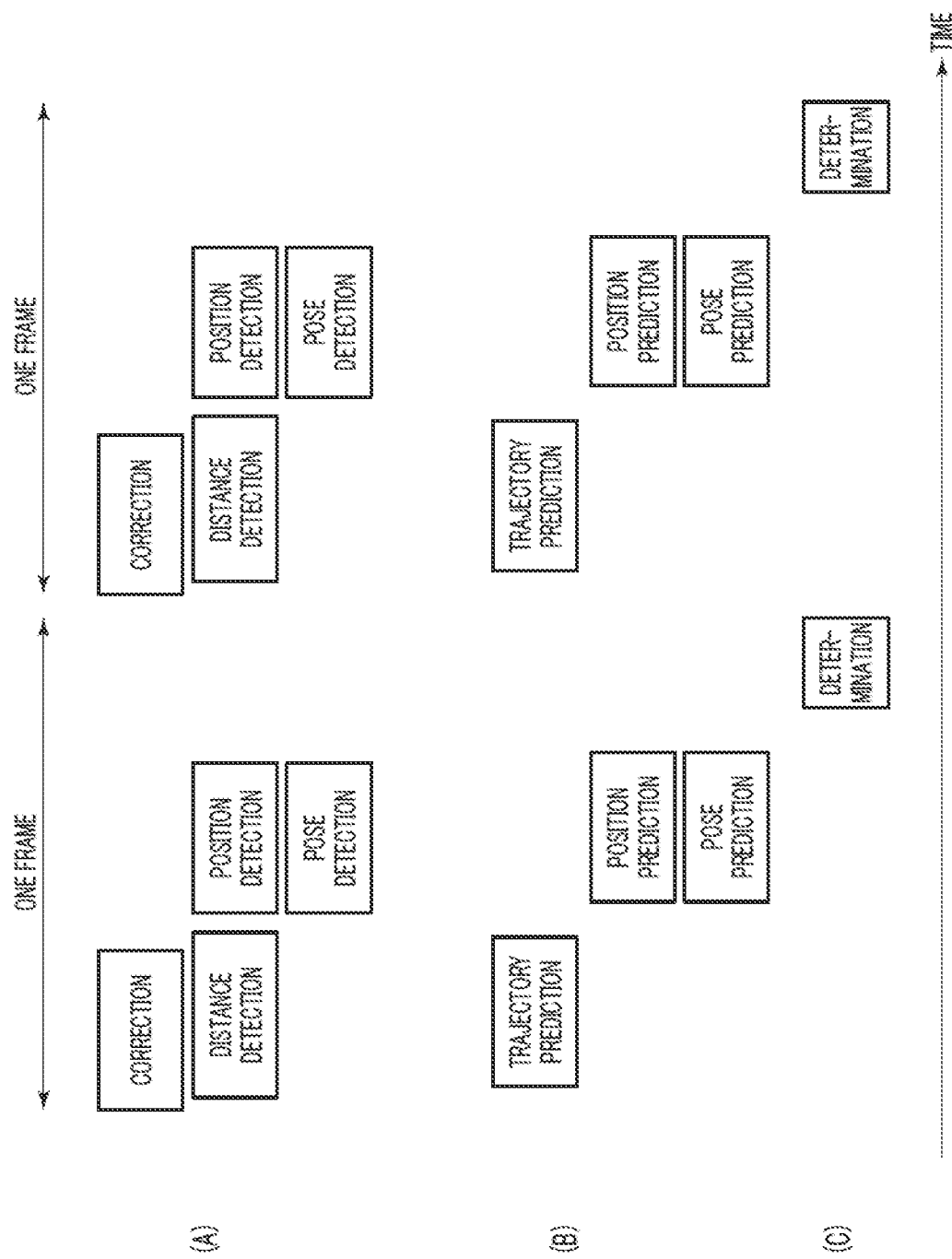

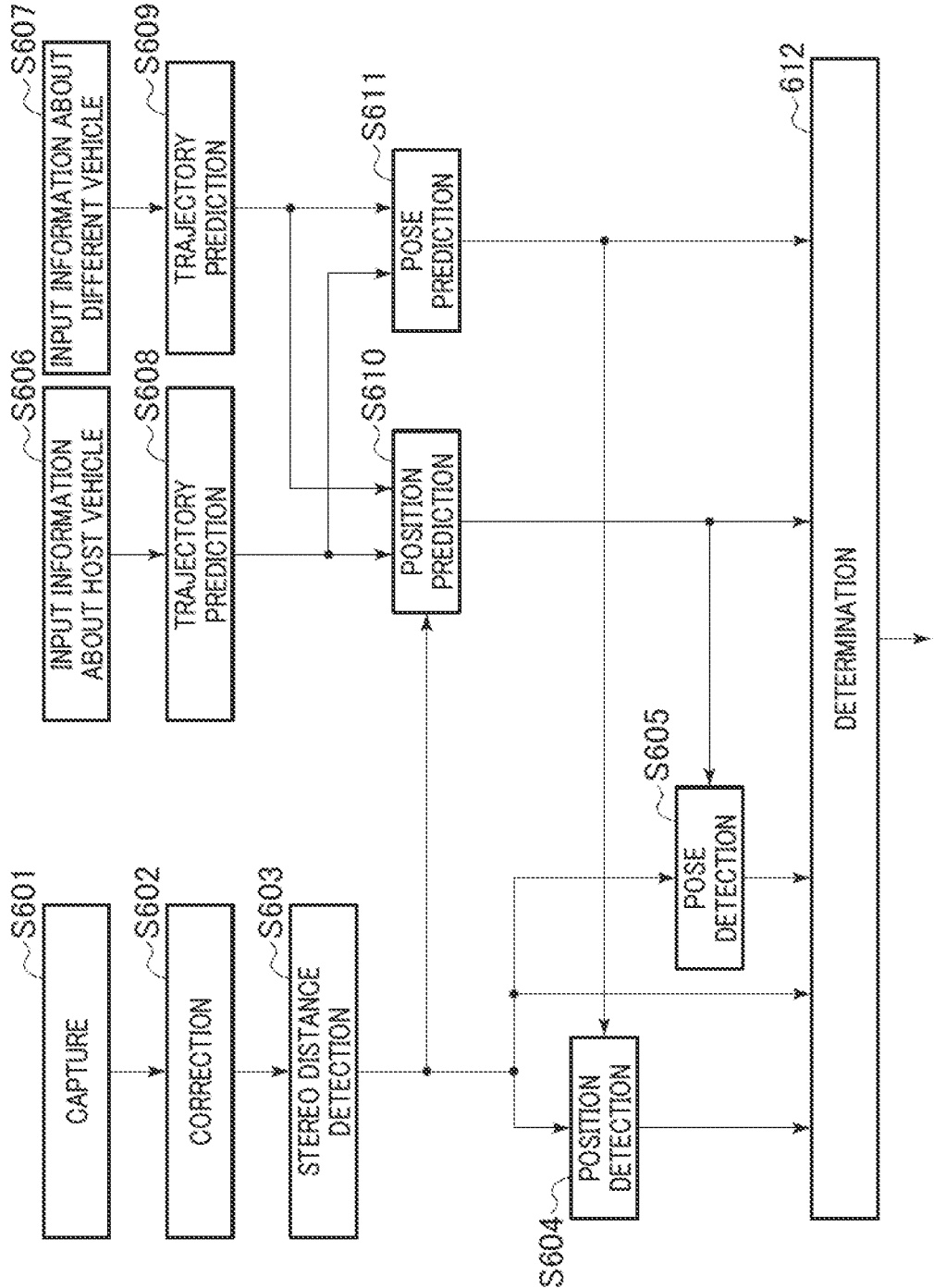

OBJECT DETECTION DEVICE, TRAVEL CONTROL SYSTEM, AND TRAVEL CONTROL METHOD

TECHNICAL FIELD

The present invention relates to an object detection device that detects an object such as a preceding vehicle from a host vehicle.

BACKGROUND ART

For example, Patent Literature 1 proposes a technique of predicting a travel trajectory of a preceding vehicle traveling ahead of a host vehicle as a background art of this technical field. Specifically, Patent Literature 1 describes that an image captured by an image capture device is analyzed to detect an orientation and speed of a preceding vehicle and to thus predict the travel trajectory.

CITATION LIST

Patent Literature

Patent Literature 1: Japanese Unexamined Patent Application Publication No. 2018-97644

SUMMARY OF INVENTION

Technical Problem

The technology in Patent Literature 1 analyzes an image captured by an image capture device, detects an orientation and speed of a preceding vehicle, and predicts the travel trajectory. Therefore, when the object moves out of a capture view angle, the tracking accuracy may be reduced.

The present invention is achieved to solve such a problem and has a main objective to provide, e.g., an object detection device able to accurately detect an object regardless a view angle position of and distance to the object.

Solution to Problem

An object detection device of the present invention that solves the above problem includes: a distance detection portion that detects a distance to an object; a position detection portion that detects a position of the object based on the distance detected by the distance detection portion; a pose detection portion that detects a pose of the object based on the distance detected by the distance detection portion; a first vehicle information input portion that inputs state information about a host vehicle; a second vehicle information input portion that inputs state information about a different vehicle; a position prediction portion that predicts a position of the different vehicle based on the state information about the host vehicle and the state information about the different vehicle respectively inputted by the first vehicle information input portion and the second vehicle information input portion; a pose prediction portion that predicts a pose of the different vehicle based on the state information about the host vehicle and the state information about the different vehicle inputted respectively by the first vehicle information input portion and the second vehicle information input portion; and a determination portion that determines a distance to, a position of, and a pose of the different vehicle in response to the information detected or predicted respectively by the distance detection portion, the position detection portion, the pose detection portion, the position prediction portion, and the pose prediction portion.

Advantageous Effect of Invention

According to the present invention, regardless of a view angle position of and a distance to an object, the object can be accurately detected. More characteristics relating to the present invention become clear from the present description and the accompanying drawings. Additionally, a problem, a configuration, and an advantageously effect other than the above description become clear by the explanation of the following embodiments.

BRIEF DESCRIPTION OF DRAWINGS

FIG. 5 illustrate processing timing of the object detection device of First Embodiment.
FIG. 6 illustrates a processing flow of the object detection device of First Embodiment.

DESCRIPTION OF EMBODIMENTS

Hereinafter, embodiments of the present invention are explained with reference to the drawings. In the following embodiments, a preceding vehicle is mentioned as an example of an object whose position is detected and a position of the preceding vehicle is detected. This does not limit the present invention. A position of any object may be detected.

First Embodiment

Figure 1:
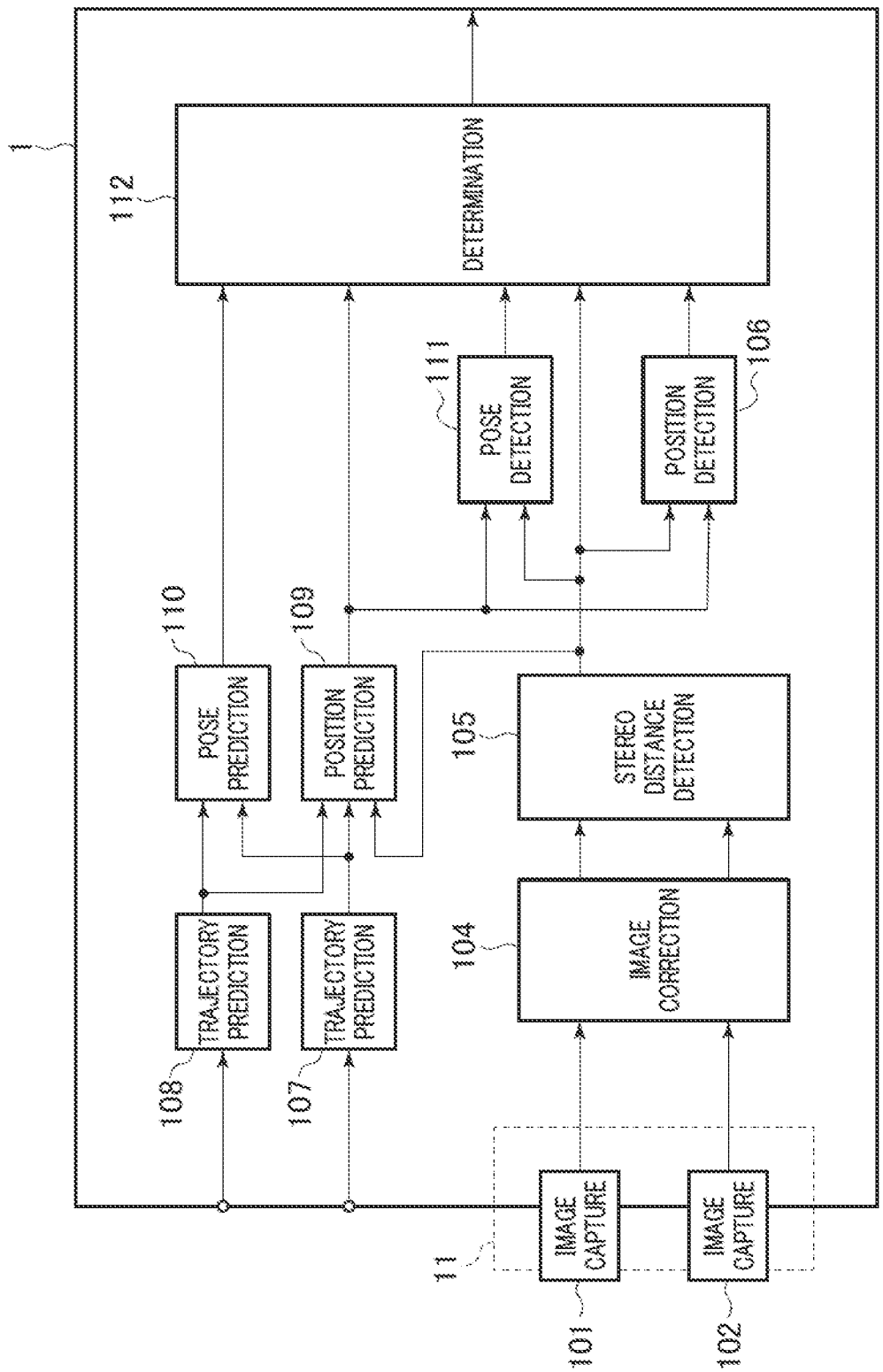
FIG. 1 illustrates a configuration of an object detection device of First Embodiment.

FIG. 1 illustrates a configuration of an object detection device of First Embodiment of the present invention. A reference sign 1 indicates the object detection device of the present embodiment. The object detection device 1 is mounted, for example, at the front of a host vehicle, recognizes an object such as a preceding vehicle that is a different vehicle, and forms part of a travel control system that assists, for example, travel control for traveling to follow the preceding vehicle.

The object detection device 1 is housed, for example, in a body of an in-vehicle stereo camera. The object detection device 1 includes a left and right pair of image capture portions 101 and 102 (first image capture portion, second image capture portion), an image correction portion 104, a stereo distance detection portion 105, a position detection portion 106, trajectory prediction portions 107 and 108, a position prediction portion 109, a pose prediction portion 110, a pose detection portion 111, and a determination portion 112.

The image capture portions 101 and 102 have an image sensor equipped with an optical lens. These image capture portions 101 and 102 repeatedly capture one image at predetermined timing to output the captured image. The image capture portion 101 and the image capture portion 102 are mounted away from each other at a predetermined distance in the left and right direction. The object detection device 1 is capable of calculating a distance to a subject from a shift, so-called parallax, between images respectively captured by the image capture portions 101 and 102.

It is noted that FIG. 1 illustrates an example in which the components of the object detection device 1 are housed in the same body. The image capture portions 101 and 102 may be, for example, housed together in a body different from that for the other components (surrounded by a dashed line 11 in FIG. 1) or respectively housed in different bodies to be mounted to the vehicle. In that case, image signals may be transferred by connecting the components to each other via unillustrated connection cables. The image transmission method using connection cables includes a transmission method using differential transmission lines of the LVDS (Low Voltage Differential Signaling) method.

Additionally, by use of color image sensors as image sensors of the image capture portions 101 and 102, the object detection device 1 becomes able to acquire color information about captured images and to determine a state of a traffic signal and a state of a taillight of a preceding vehicle from the color information in addition to brightness information.

The image correction portion 104 respectively captures images from the image capture portions 101 and 102, corrects each image by a previously measured correction value to match brightness of the images, corrects distortion of the images due to the lenses, and executes correction to match horizontal positions of the images of the image capture portion 101 and image capture portion 102 to each other by a previously measured correction value.

Measurement of each correction value is beforehand made by a manufacturing process of the object detection device 1. Each object detection device 1 before a correction value is applied captures an image of a specific subject. A brightness correction value of each pixel is determined to equalize brightness of the acquired images. A geometric correction value of each pixel is determined to counteract lens distortion and parallel the images. Each object detection device 1 stores the values as a correction table in an unillustrated nonvolatile memory.

The stereo distance detection portion 105 inputs images from the image correction portion 104 and detects a distance to a subject and a type of an object. For example, the method of detecting the distances includes the following method. The stereo distance detection portion 105 captures images from the image correction portion 104 to calculate parallax. As above, since the image capture portion 101 and the image capture portion 102 are installed away from each other at a predetermined distance in the left and right direction, the captured images have parallax. The so-called stereo processing is made to calculate this parallax.

A technique of calculating parallax includes a block matching method. Specifically, first, the stereo distance detection portion 105 searches an area on an image captured by the image capture portion 102. This area corresponds to a small block area having a predetermined size that is cut out from a specified image area of the image captured by the image capture portion 101. This predetermined size has, for example, eight pixels in height and eight pixels in width. The stereo distance detection portion 105 horizontally shifts the same sized block areas on the image of the image capture portion 102 by the number of pixels specified as a search density, during which correlation values are evaluated. In this case, the stereo distance detection portion 105 sets the search range to 128 pixels and the search density to two pixels as a combination or the search range to 32 pixels and the search density to one pixel as a combination. This enables control of processing burden and accuracy of the calculation together with the designation of the processing area. When the search density is increased, the accuracy of the distance to an object to be detected becomes coarse, but the processing burden in the search range is decreased. As the search density is decreased, the accuracy of the distance to be detected is increased.

The positional difference between the matched block areas in the captured image of the image capture portion 101 and the captured image of the image capture portion 102 is a parallax indicated as the number of pixels. The stereo distance detection portion 105 is able to determine a distance to an object appearing in the block area in a real environment by using this parallax. It is noted that this example uses a block area as an image element where a distance is to be determined. A match comparison technique of evaluating correlation values includes using a position having a smaller total of differences between brightness of pixels in a block area to be compared as a parallax.

It is well known that a distance to be detected is determined from lens focus distances of the image capture portion 101 and the image capture portion 102, a baseline length which is a distance between the image capture portion 101 and the image capture portion 102, the above determined parallax, and a pixel pitch of an image capture sensor. However, this does not limit the distance calculation method in the present invention. Additionally, the image element which is a target of distance determination is not limited to the above block area but may use each pixel forming an image capture sensor.

In the object detection method, for example, when pieces of distance information indicating generally the same distances are present near each other, the stereo distance detection portion 105 groups the pieces of distance information as one group. Then, the stereo distance detection portion 105 regards the group as an object when the size of the group is a predetermined size or more. Then, the stereo distance detection portion 105 detects the object as, for example, a vehicle based on the size and shape of the detected group. There is a method of detecting a size and shape of an object in comparison with pattern data previously held as reference data. This processing method is able to accurately acquire a distance from a host vehicle to a preceding object. This is therefore used as information about avoidance of collision, such as deceleration or stop of a host vehicle. The acquired type of the object and the acquired distance to the object are outputted to the position detection portion 106, the position prediction portion 109, the pose prediction portion 110, the pose detection portion 111, and the determination portion 112, which are mentioned later.

The position detection portion 106 detects the position of the object relative to the host vehicle based on a result of the stereo distance detection portion 105. The position detection portion 106 detects, for example, a left position and a right position indicated by a difference between the center between the installation positions of the image capture portion 101 and image capture portion 102 and the lateral center of the object. The position detection portion 106 is able to select and detect only an object recognized as a vehicle.

For example, when the image capture portions 101 and 102 are disposed away from each other in the vehicle width direction (left-right) of the host vehicle to execute forward image capture through the windshield of the host vehicle, the distance detected in the present embodiment is a distance in the direction of the central axis of the vehicle (Z direction) set in the longitudinal direction of the vehicle. The left position and right position detected in the present embodiment indicate a distance of the host vehicle in the vehicle width direction (X direction) (for example, see FIG. 9).

State information about the host vehicle is inputted into the trajectory prediction portion 107 (first vehicle information input portion). The trajectory prediction portion 107 predicts a trajectory of the host vehicle based on the inputted state information about the host vehicle. The state information about the host vehicle to be inputted includes a steering angle, a yaw rate, a speed, an acceleration, a wheel speed, position information from a satellite, and a travel plan of a vehicle.

State information about a different vehicle is inputted into the trajectory prediction portion 108, which is another trajectory prediction portion (second vehicle information input portion). The trajectory prediction portion 108 predicts a trajectory of a preceding vehicle based on the inputted state information about the preceding vehicle. Similarly, the state information about the preceding vehicle to be inputted includes a steering angle, a yaw rate, a speed, an acceleration, a wheel speed, and position information from a satellite. The input means of the state information about the preceding vehicle includes wireless transfer of information between vehicles. This means is unillustrated. That is, the host vehicle executes intervehicle communications with the preceding vehicle to acquire the state information about the preceding vehicle.

The position prediction portion 109 predicts the distance to and position of the preceding vehicle relative to the host vehicle based on the trajectory predictions for the host vehicle and preceding vehicle acquired by the trajectory prediction portion 107 and the trajectory prediction portion 108. Further, the position prediction portion 109 identifies the position of the rear end surface which is a predetermined part of the object, and outputs the position to the pose detection portion 111 mentioned below. The rear end surface of the object is, for example, a trailing surface of a vehicle. When the vehicle turns and both the trailing surface and side surface of the vehicle are included in the acquired image, the position prediction portion 109 is able to detect the pose of the trailing surface other than the vehicle side surface to improve the accuracy of the pose detection. The method of identifying the position of the rear end surface includes, e.g., detection from an orientation (yaw angle) of a preceding vehicle relative to a host vehicle. For example, the position of the rear end surface can be identified by acquiring the state information including the information about the orientation of the preceding vehicle from the preceding vehicle by intervehicle communications.

The pose prediction portion 110 predicts the pose of the preceding vehicle relative to the host vehicle based on the trajectory predictions for the host vehicle acquired and preceding vehicle acquired by the trajectory prediction portion 107 and the trajectory prediction portion 108. The pose is a relative yaw angle between a preceding vehicle and a host vehicle to detect an angular difference theta (see FIG. 9).

The pose detection portion 111 detects the yaw angle theta which is an orientation of an object, such as a relative angular difference between the preceding vehicle and the host vehicle. This angular difference changes in response to change of the yaw angles of the preceding vehicle and host vehicle. The pose detection portion 111 detects an orientation of the object by using a detection result of the stereo distance detection portion 105. The pose detection portion 111 uses a linear fit of the horizontal distance of the opposing surface of the object to determine the inclination.

For example, when a distance Z (depth) relative to a coordinate X in the horizontal direction (transverse direction) of a trailing surface of an object (preceding vehicle) is indicated as (X, Z), it is assumed that (X1, Z1), (X2, Z2), ..., (X5, Z5) are acquired as measurement results. For example, the pose detection portion 111 determines a regression line (Z=a1×X+a2; a1, a2: constant) by, e.g., the least-square method to calculate theta (=arctan (a1)) from the inclination a1.

On detection, the pose detection portion 111 inputs information from the position prediction portion 109 to identify the trailing surface of the preceding vehicle and detects only the trailing surface by excluding the vehicle side surface. The accuracy of the pose detection can be improved. Additionally, the pose detection portion 111 is able to select and detect only the object recognized as a vehicle.

The determination portion 112 receives a distance detection result from the stereo distance detection portion 105, a position detection result from the position detection portion 106, a pose detection result from the pose detection portion 111, a position prediction result from the position prediction portion 109, and a pose prediction result from the pose prediction portion 110. The determination portion 112 determines the results to output a detection result of the object to outside the object detection device 1.

The determination portion 112 changes the rate of using the actual detection results by the position detection portion 106 and pose detection portion 111 and the prediction results by the position prediction portion 109 and pose prediction portion 110 in response to an image capture condition of the object. The rate of using the actual detection results and the prediction results is determined in response to the range of the object in the captured image.

The determination portion 112 executes a process of calculating the range of the object appearing in the captured images of the image capture portions 101 and 102. In response to the range of the object, the weighting for the actual detection results and the prediction results is changed. Specifically, as the range of the object in the captured images is reduced, the detection values detected by the stereo distance detection portion 105, the position detection portion 106, and the pose detection portion 111 are weighted lower and the prediction values predicted by the position prediction portion 109 and the pose prediction portion 110 are weighted higher.

Thus, for example, when the preceding vehicle fully appears in the captured images, only the actual detection results are outputted from the determination portion 112. Then, when the range of the preceding vehicle appearing in the captured images is reduced due to, e.g., a turning of the preceding vehicle at a crossing, the usage rate of the actual detection results is reduced and accordingly the usage rate of the prediction results is increased. Then, when the preceding vehicle is out of the view angle range by a predetermined value, all the results outputted from the determination portion 112 may be switched from the actual detection results to the prediction results. As the range of the preceding vehicle appearing in the captured images gradually increases to return to the original when the host vehicle is also turning at the crossing to follow the preceding vehicle, the rate of the actual detection results increases and accordingly the rate of using the prediction results decreases.

It is noted that, for example, the image capture portion 101, the image capture portion 102, the image correction portion 104, and the stereo distance detection portion 105 in the object detection device 1 include an electronic circuit. The other components of the object detection device 1 are realized by software processing using an unillustrated microcomputer etc. It is also possible to realize the stereo distance detection portion 105 by software processing.

Figure 2:
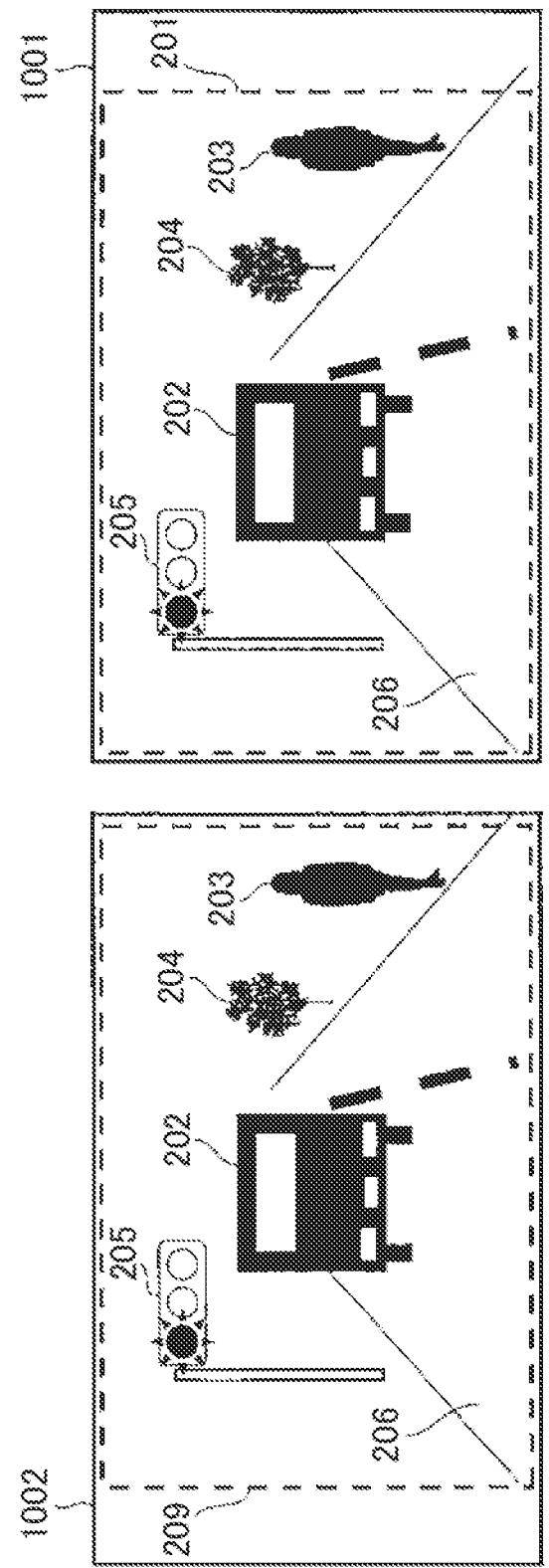
FIG. 2 illustrates an example of a pair of captured images simultaneously captured by left and right image capture portions.

FIG. 2 is a diagram illustrating an example of captured images captured by the object detection device 1 of First Embodiment of the present invention. In this figure, a reference sign 1001 indicates a captured image captured by the image capture portion 101 and corrected by the image correction portion 104, and a reference sign 1002 indicates a captured image captured by the image capture portion 102 and corrected by the image correction portion 104. A reference sign 202 is a preceding vehicle which is a subject. A reference sign 203 is a pedestrian who is a subject. A reference sign 204 is a roadside tree which is a subject. A reference sign 205 is a traffic signal which is a subject. A reference sign 206 is a road surface which is a subject.

Additionally, in this figure, reference signs 201 and 209 are areas (common image capture areas) captured commonly in the captured image 1001 and captured image 1002. As above, the commonly captured areas are offset from each other between the captured image 1001 and the captured image 1002. The stereo distance detection portion 105 calculates a distance to the subject by using this offset amount, i.e., parallax.

Figure 3:
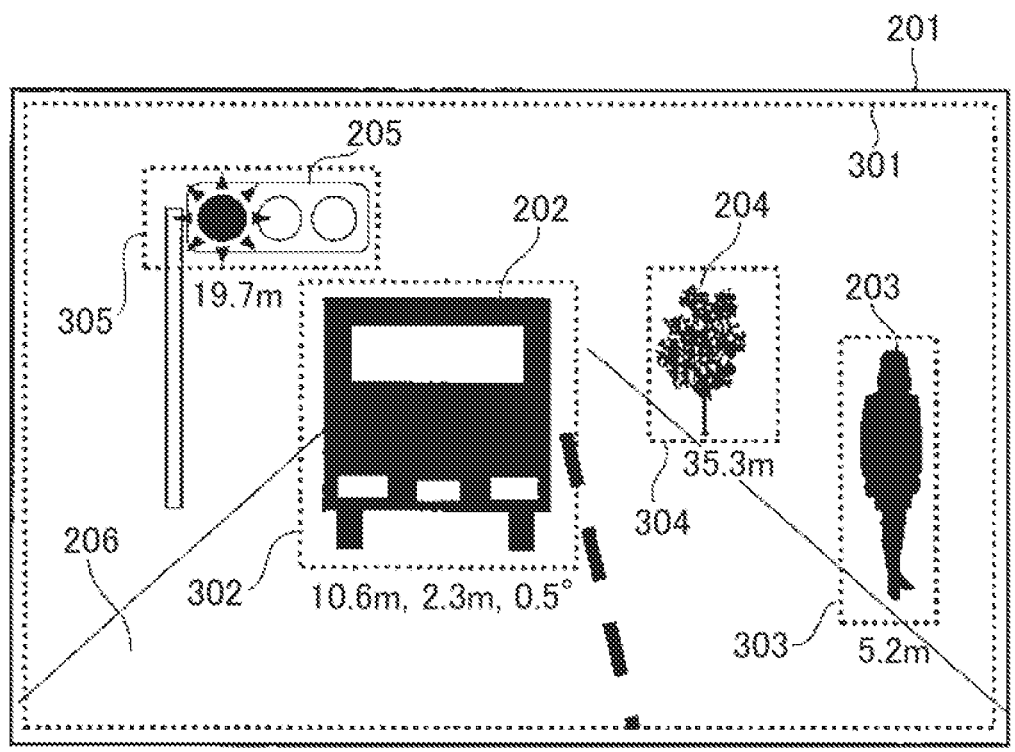
FIG. 3 illustrates an example of a result detected using the pair of captured images illustrated in FIG. 2.

FIG. 3 illustrates a captured image captured by the object detection device 1 of First Embodiment and an example of operations of the stereo distance detection portion 105, position detection portion 106, and pose detection portion 111. FIG. 3 illustrates an example of the result detected using the pair of captured images illustrated in FIG. 2. In this figure, the area 201 is captured by the image capture portion 101 and common to the area in the image corrected by the image correction portion 104 and captured by the image capture portion 102 as above.

A reference sign 301 indicates a processing area in which the stereo distance detection portion 105 detects a distance to a subject and a type of an object. In the present embodiment, the processing area 301 is the whole of the area 201. The stereo distance detection portion 105 determines the parallaxes in the range of the processing area 301 by using the above block matching method and detects an object from the group of parallaxes.

Reference signs 302, 303, 304, and 305 indicate processing areas illustrated to surround the detection results of the objects with the dashed line frames. The frames and numbers in the image are not present in the captured image but superimposed and explicitly described on the image. In the present embodiment, a preceding vehicle 202 detected in the processing area 302 is detected to be positioned at the distance z of 10.6 m to the host vehicle, position x of 2.3 m, and pose theta of 0.5 degrees. Then, a pedestrian 203 detected in the processing area 303 is detected to be positioned at the distance z of 5.2 m. A roadside tree 204 in the processing area 304 is detected to be positioned at the distance z of 35.3 m. A traffic signal 205 in the processing area 305 is detected to be positioned at the distance z of 19.7 m. Thus, according to the object detection device 1, a distance to, a position of, and a pose of an object can be detected throughout a captured image. Detection values of the distance to, position of, and pose of the object detected by the detection portions 105, 106, and 111 are outputted to the determination portion 112.

Figure 4:
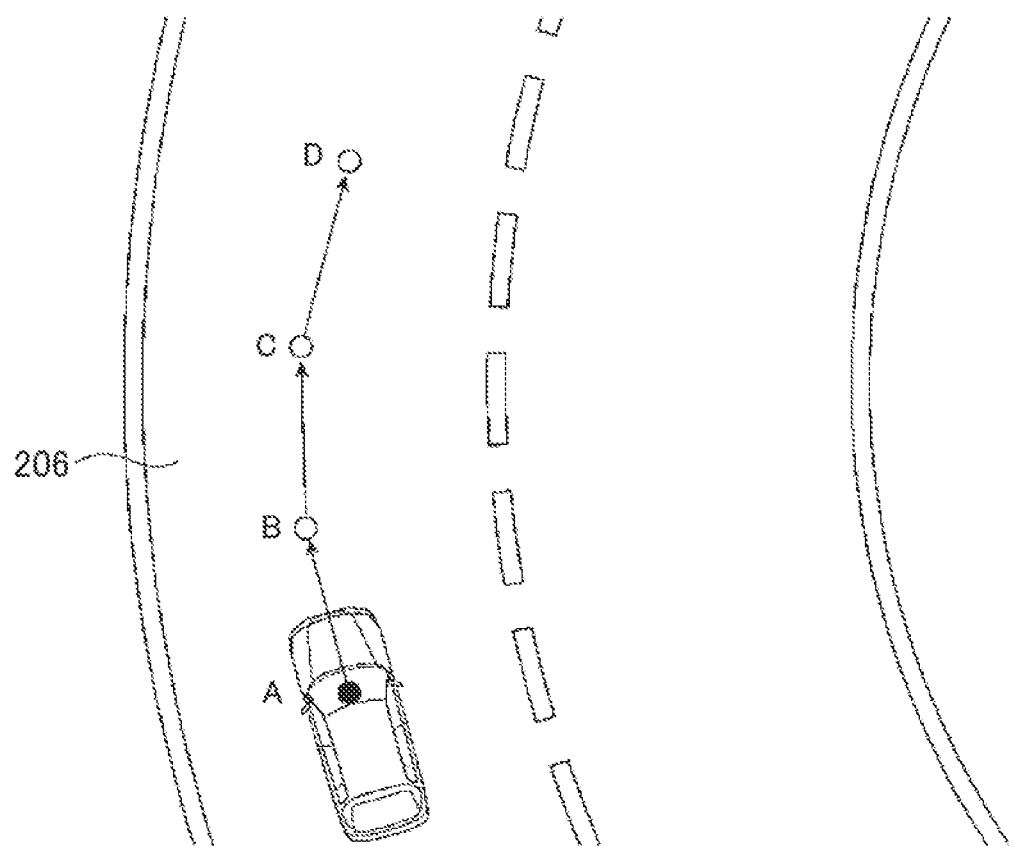
FIG. 4 illustrates an example of a travel trajectory of a vehicle.

FIG. 4 is a diagram illustrating a travel trajectory of the vehicle. The processes of the above trajectory prediction portions 107 and 108, position prediction portion 109, and pose prediction portion 110 use, for example, the dead-reckoning method to predict the position and pose of the vehicle. First, a point A is set as a starting point, and the position and pose of the vehicle at the next point B are predicted at a certain cycle from the traveled distance of the vehicle from the point A and the travel orientation of the vehicle. From the above steering angle, yaw rate, speed, acceleration, wheel speed, and position information from a satellite as state information about the vehicle for prediction, the travel amount is calculated at the certain cycle and added to the coordinate of the point A to predict the point B. Further, additions and updates are overlaid at the point B, a point C, and a point D. The trajectory of the vehicle can be thus predicted and further the difference between the trajectories of the host vehicle and preceding vehicle is acquired to enable prediction of the position and pose of the preceding vehicle relative to the host vehicle. This method includes errors in the travel amount. Thus, as additions are overlaid, errors are accumulated.

Additionally, there is also a method to determine a difference between the travel amounts of the host vehicle and preceding vehicle. Additions of the differences are then made to predict the position and pose of the preceding vehicle relative to the host vehicle. Further, as another method, a travel plan determined in the vehicle is inputted to enable prediction of the position and pose without predicting the trajectory.

FIG. 5 are diagrams illustrating processing timing of the object detection device 1 of the present embodiment. FIG. 5(A) illustrates the processing timing of the image correction portion 104, the stereo distance detection portion 105, the position detection portion 106, and the pose detection portion 111. FIG. 5(B) illustrates the processing timing of the trajectory prediction portions 107 and 108, the position prediction portion 109, and the pose prediction portion 110. FIG. 5(C) illustrates processing timing of the determination portion 112.

In FIG. 5(A), the above distance detection processing by the image correction portion 104 and the stereo distance detection portion 105 is executed to detect an object, detect the position of the object in the position detection portion 106, and detect the pose of the object in the pose detection portion 111.

Additionally, in FIG. 5(B), the trajectories of the host vehicle and the preceding vehicle are predicted by the trajectory prediction portions 107 and 108, the position of the preceding vehicle relative to the host vehicle is predicted in the position prediction portion 109, and the pose of the preceding vehicle relative the host vehicle is predicted in the pose prediction portion 110.

In FIG. 5(C), the detection result of the object determined in the determination portion 112 based on the detection results acquired in FIG. 5(A) and FIG. 5(B) is outputted.

The present embodiment has explained the case in which the position detection, pose detection, position prediction, and pose prediction are processed at the same cycle and all these processes are made once in one frame. The cycle may be different. At each determination cycle, each newest result may be used.

FIG. 6 is a diagram illustrating a processing flow of the object detection device of First Embodiment. First, images are captured by the image capture portions 101 and 102 (Step S601). Brightness correction, lens distortion correction, and horizontal position alignment are made by the image correction portion 104 in each image captured by the image capture portions 101 and 102 as above (Step S602). Next, the stereo distance detection portion 105 detects the object and the distance to the object in the processing area 301 (Step S603). Further, the position detection portion 106 detects the position of the object (Step S604) and the pose detection portion 111 detects the pose (Step S605).

In contrast, state information about the host vehicle is inputted (Step 606) and state information about the preceding vehicle is inputted (Step 607). Based on each piece of the inputted information, the trajectory prediction of the host vehicle (Step 608) and the trajectory prediction of the preceding vehicle (Step 609) are made. Further, the position prediction (Step 610) and the pose prediction (Step 611) are made based on the trajectory predictions of the host vehicle and the preceding vehicle.

Finally, the determination portion 112 executes determination based on the detection result of the object at each Step and outputs the determination result (Step S612). The object detection device 1 repeats these processes, for example, at each one frame. The determination portion 112 changes the usage rate between the actual detection results and prediction results in response to the image capture condition of the preceding vehicle appearing in the captured image. The determination portion 112 calculates the range of the preceding vehicle captured in the captured image and determines the usage rate between the actual detection values and prediction values of the distance to and the position and pose of the preceding vehicle in response to the range of the preceding vehicle. Then, the values of the distance, position, and pose based on the rate are outputted.

Figure 7A:
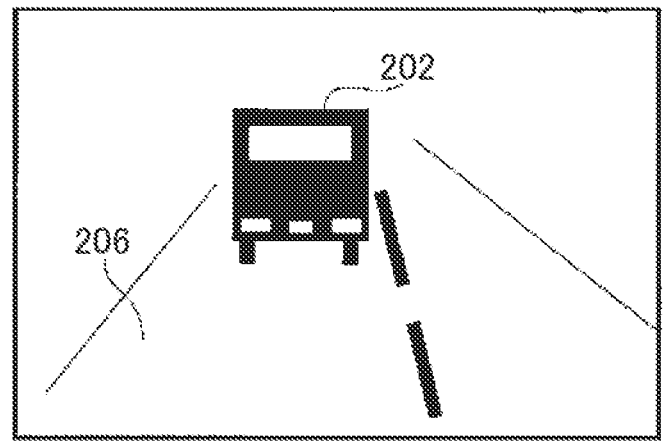
FIGS. 7A-7C illustrate examples of captured images during travel.
Figure 7B:
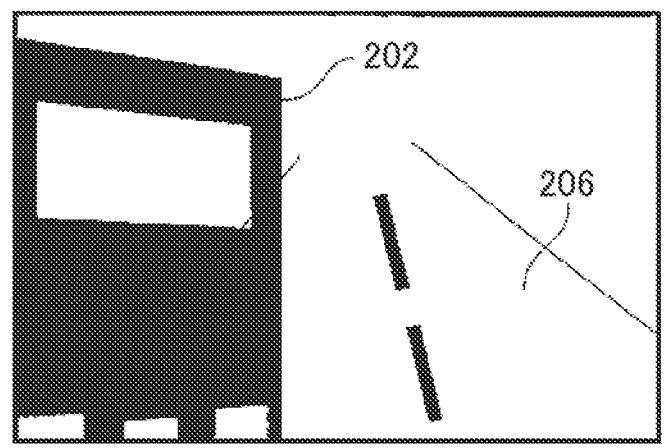
Figure 7C:
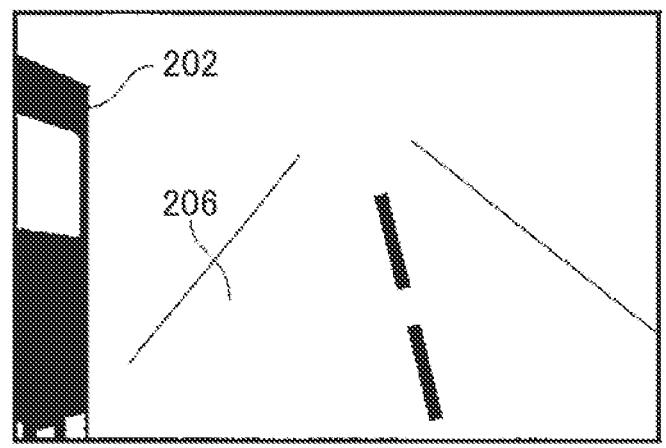

FIG. 7 are diagrams illustrating examples of captured images during travel captured from the vehicle mounting the object detection device 1 of the present embodiment. FIG. 7(A) illustrates an image captured by the image capture portion 101 at a certain time t1. This image is acquired when the preceding vehicle 202 is fully within the capture view angle. FIG. 7(B) illustrates an image captured by the image capture portion 101 at a time t2 after the time t1. This image is acquired when the preceding vehicle 202 is approached, turns left, and is not fully within the capture view angle. Further, FIG. 7(C) is an image captured at a time t3 after the time t2 when the preceding vehicle 202 turns left further to be about to be out of the view angle.

FIG. 8 are diagrams illustrating the rate between the detection results detected in time series from the captured images acquired during travel illustrated in FIG. 7(A), FIG. 7(B), and FIG. 7(C) and the detection results determined to be finally used. The times t1, t2, and t3 indicate the times when the captured image of FIG. 7(A), the captured image of FIG. 7(B), and the captured image of FIG. 7(C) are captured, respectively.

Figure 8A:
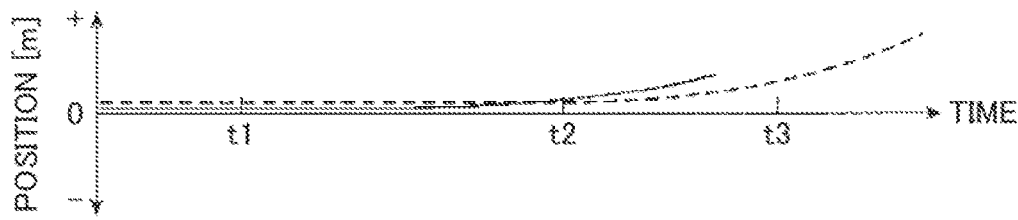
FIGS. 8A-8E illustrate examples of detection results and prediction results by the object detection device of First Embodiment.

FIG. 8(A) illustrates a detection result of the position. The solid line indicates position detection results by the position detection portion 106. The dashed line indicates position prediction results by the position prediction portion 109. In FIG. 8(A), the horizontal axis indicates a time, and the vertical axis indicates a position. As above, since the position detection portion 106 detects the left and right positions of the object from the distance detection results by the stereo distance detection portion 105, stable detection results can be acquired around the time t1 around which the preceding vehicle 202 is fully within the capture view angle. In contrast, the prediction results by the position prediction portion 109 include errors as above. Around the time t2, the preceding vehicle 202 is approaching and turning and is not fully within the view angle. Detection errors thus increases in the position detection portion 106. Since the preceding vehicle 202 generally fully moves out of the view angle around the time t3, detection of the position becomes difficult. In contrast, the position prediction by the position prediction portion 109 continues while including errors.

Figure 8B:
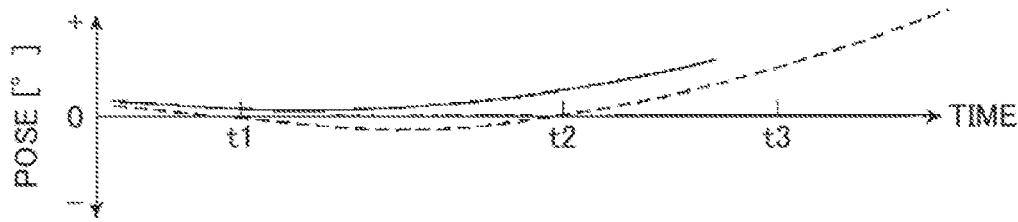

FIG. 8(B) illustrates detection results of the pose. The solid line indicates the pose detection results by the pose detection portion 111 and the dashed line indicates the prediction results by the pose prediction portion 110. In FIG. 8(B), the horizontal axis indicates a time and the vertical axis indicates a pose. In the present embodiment, the pose when the preceding vehicle 202 turns left is indicated as the plus direction. The stereo distance detection portion 105 is able to acquire stable detection results around the time t1 around which the preceding vehicle 202 is fully within the capture view angle. In contrast, the prediction results by the pose prediction portion 110 include errors as mentioned above. Around the time t2, the preceding vehicle 202 is approaching and turning and is not fully within the view angle. Detection errors thus increase in the pose detection portion 111. Since the preceding vehicle 202 generally fully moves out of the view angle around the time t3, detection of the pose becomes difficult. In contrast, the pose prediction portion 110 continues prediction while including errors.

Figure 8C:
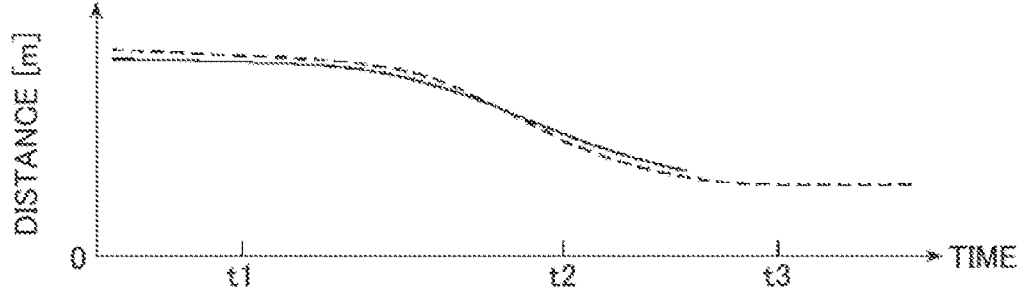

FIG. 8(C) illustrates detection results of the distance. The solid line indicates distance detection results by the stereo distance detection portion 105. The dashed line indicates prediction results by the position prediction portion 109. In FIG. 8(C), the horizontal axis indicates a time and the vertical axis indicates a distance. Around the time t1, the stereo distance detection portion 105 is able to acquire stable detection results when the preceding vehicle 202 is fully within the capture view angle. In contrast, the prediction results by the position prediction portion 109 include errors as mentioned above. Around the time t2, the preceding vehicle 202 is approaching and turning and not fully within the view angle. Detection errors thus increase in the stereo distance detection portion 105. Since the preceding vehicle 202 generally fully moves out of the view angle around the time t3. Detection of the distance thus becomes difficult. In contrast, the position prediction portion 109 continues prediction while including errors.

Figure 8D:
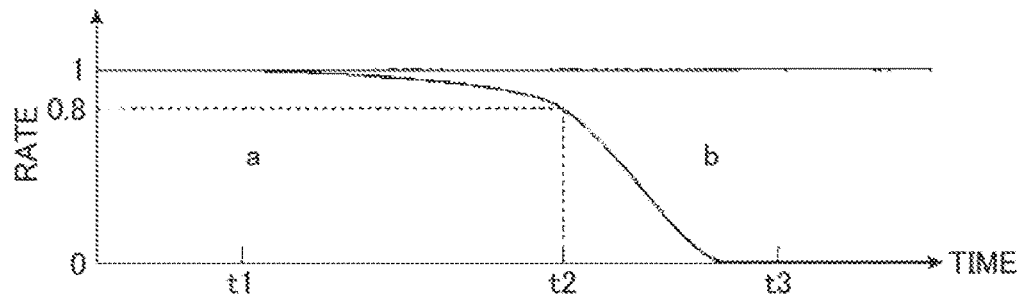
Figure 8E:
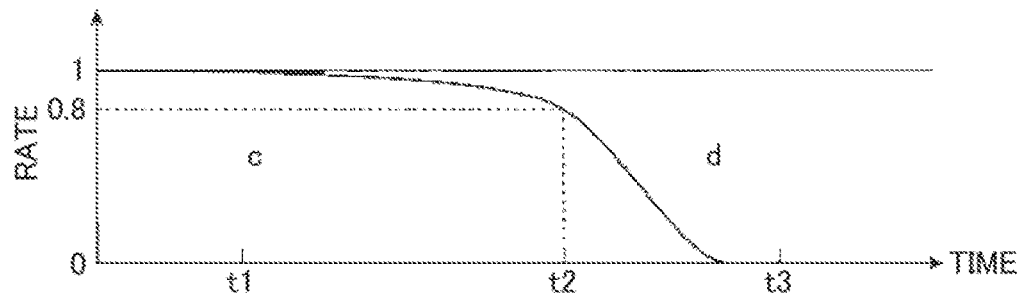

FIG. 8(D) and FIG. 8(E) illustrate the rate of the detection results finally used by the determination portion 112 in the acquired detection results. In FIG. 8(D) and FIG. 8(E), the horizontal axis indicates a time and the vertical axis indicates a rate.

The rate a illustrated below the curve of FIG. 8(D) indicates the rate that the determination portion 112 uses the detection results by the position detection portion 106. The rate b illustrated above the curve of FIG. 8(D) indicates the rate that the determination portion 112 uses the prediction results by the position prediction portion 109. The total value of the rates a and b is 1. The determination portion 112 uses (weights) the detection results or prediction results accurately acquired at a current time at a high usage rate.

Around the time t1, the determination portion 112 weights and uses the detection results by the position detection portion 106. Around the time t2, the determination portion 112 increases the rate of the results of the position prediction portion 109. Around the time t3, the determination portion 112 uses only the prediction results of the position prediction portion 109. Further, when the position of the object fully moves out of the capture view angle, the determination portion 112 uses the prediction results by the position prediction portion 109.

For example, around the time t2, the rate a is 0.8 and the rate b is 0.2. Here, when the position of the actual detection result by the position detection portion 106 is set to x1, the distance of the prediction result by the position prediction portion 109 is set to x2, and the distance outputted by the determination portion 112 is set to x, x=0.8×x1+0.2×x2 around the time t2, for example.

Additionally, the rate c illustrated below the curve of FIG. 8(E) is the rate that the determination portion 112 uses the detection results of the pose detection portion 111. The rate d illustrated above the curve of FIG. 8(E) is the rate that the determination portion 112 uses the prediction results of the pose prediction portion 110. The total value of the rate d and the rate c is 1. The rate used by the determination portion 112 uses (weights) the detection results or prediction results accurately acquired at a current time at a high usage rate.

Around the time t1, the determination portion 112 weights and uses the detection results by the pose detection portion 111. Around the time t2, the determination portion 112 increases the rate of the prediction results by the pose prediction portion 110. At the time t3, the determination portion 112 uses only the prediction results of the pose prediction portion 110. Further, when the position of the object is fully out of the capture view angle, the determination portion 112 uses the prediction results by the pose prediction portion 110.

When the position detected by the position detection portion 106 is within a predetermined range, the determination portion 112 may use the detection results of the stereo distance detection portion 105, position detection portion 106, and pose detection portion 111 as the position and pose of the preceding vehicle. When the position detected by the position detection portion 106 is outside the predetermined range, the determination portion 112 may use the prediction results of the position prediction portion 109 and pose prediction portion 110 as the position and pose of the preceding vehicle.

Additionally, even when the position detected by the position detection portion 106 is within the predetermined range, the determination portion 112 may use the results of the position prediction portion 109 and pose prediction portion 110 when the distance detected by the stereo distance detection portion 105 is longer than a predetermined distance and it is accordingly difficult to ensure the detection accuracy.

Additionally, when the distance detected by the stereo distance detection portion 105 is shorter than a predetermined distance but the position detected by the position detection portion 106 is outside the predetermined range and it is accordingly difficult to ensure the detection accuracy, the determination portion 112 may use the results of the position prediction portion 109 and pose prediction portion 110.

Further, after the preceding vehicle 202 once moves out of the capture view angle and the distance to the preceding vehicle 202 is accordingly undetectable by the stereo distance detection portion 105, when the preceding vehicle 202 returns to the capture view angle and the distance to the preceding vehicle 202 becomes detectable by the stereo distance detection portion 105, the trajectory prediction portion 108 resets the starting point for trajectory prediction by using the results of the position detection portion 106 and pose detection portion 111. Therefore, the errors accumulated in the position prediction portion 109 and pose prediction portion 110 can be canceled.

Figure 9:
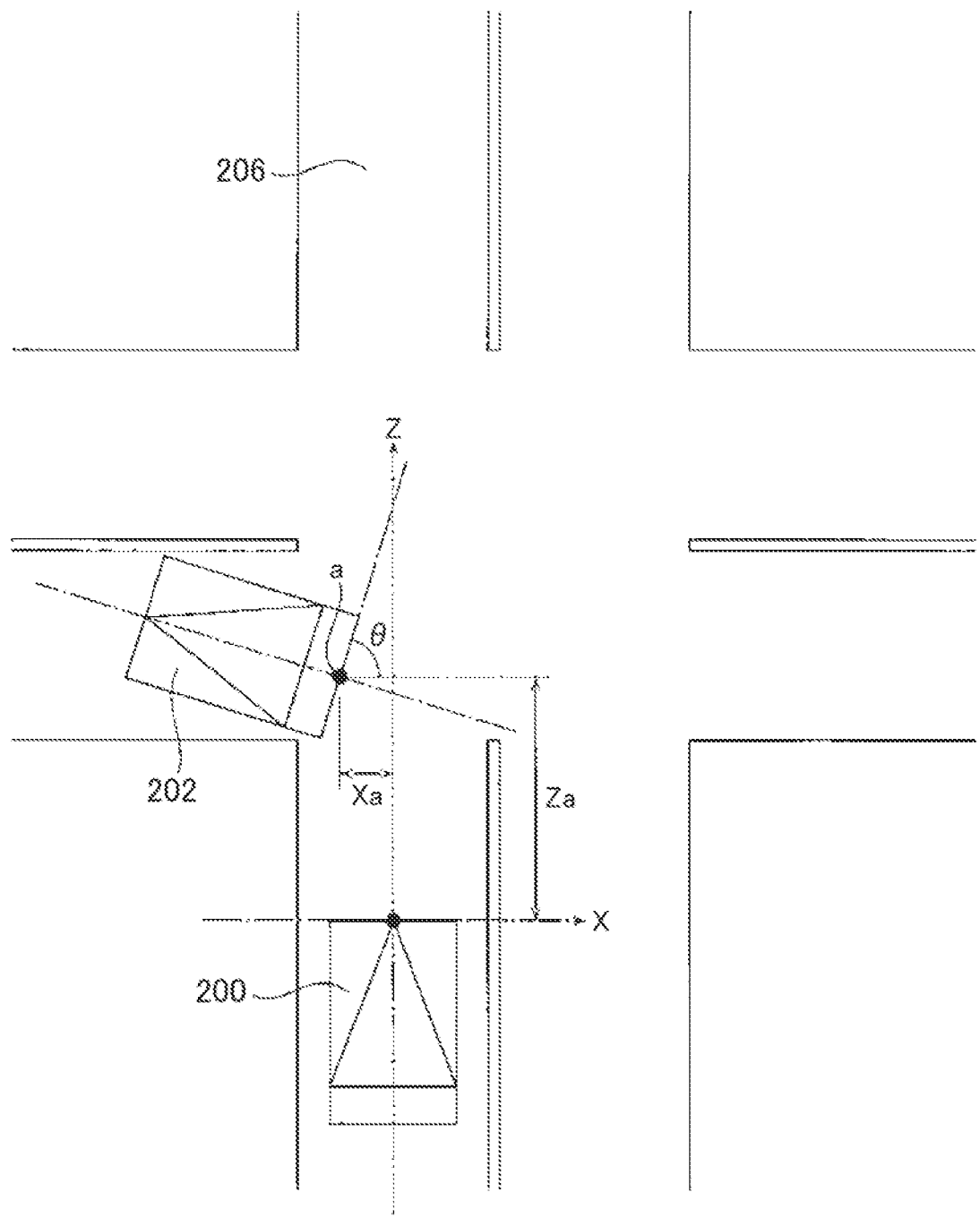
FIG. 9 explains an example of a positional relationship between a host vehicle and a preceding vehicle.

FIG. 9 is a diagram explaining a positional relationship between the host vehicle and preceding vehicle.

The object detection device 1 is mounted to a host vehicle 200 to detect a position of the preceding vehicle 202. The host vehicle 200 is autonomously driven to travel following the preceding vehicle 202 by using positional information about the preceding vehicle 202 detected by the object detection device 1. The object detection device 1 detects a distance Za, a position Xa, and a pose theta between the host vehicle 200 and the preceding vehicle 202.

As illustrated in FIG. 9, for example, when the preceding vehicle 202 turns left at a crossing, the captured image captured in the host vehicle 200 indicates that generally whole part of the preceding vehicle 202 moves out of the view angle range of the captured image (see FIG. 7(C)). In this case, the determination portion 112 executes adjustment to increase the rate of using the prediction results predicted by the position prediction portion 109 and pose prediction portion 110 and decrease the rate of using the detection results detected by the stereo distance detection portion 105, position detection portion 106, and pose detection portion 111. Then, information about the position of, distance to, and pose of the preceding vehicle 202 adjusted in the determination portion 112 is outputted to the outside and used for the control to make the host vehicle follow the preceding vehicle.

According to the object detection device 1 of the present embodiment, the distance to and position and pose of the preceding vehicle 202 can be continuously detected even when the preceding vehicle 202 moves out of the capture view angle. That is, regardless of a view angle position of or distance to an object, the object is continuously tracked, and position information, distance information, and pose information about the object can be acquired. Therefore, even when the preceding vehicle 202 moves out of the capture view angle, the preceding vehicle 202 can be accurately detected and the tracking accuracy of the host vehicle 200 can be prevented from decreasing.

Second Embodiment

Figure 10:
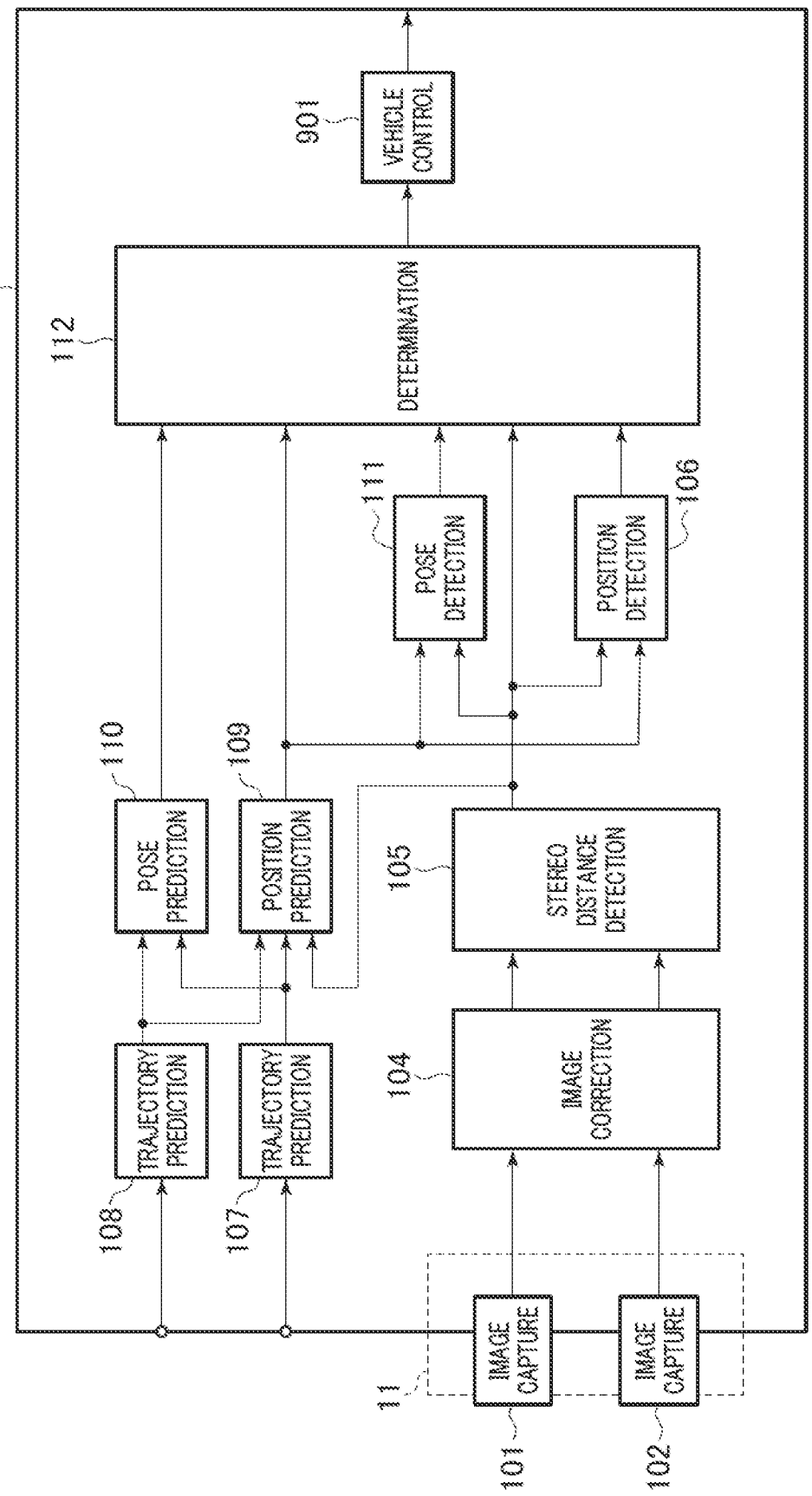
FIG. 10 illustrates a configuration of an object detection device of Second Embodiment.

FIG. 10 is a diagram illustrating a configuration of an object detection device of Second Embodiment. A characteristic in the present embodiment includes an example that a vehicle control portion is additionally provided to the object detection device 1 of First Embodiment. The vehicle control portion executes autonomous driving control for traveling that automatically tracks a preceding vehicle. The components that achieve the same functions as the components of FIG. 1 use the same reference signs as FIG. 1 and are not explained in detail. The object detection device 1 is mounted to a vehicle such as an automobile and a reference sign 901 indicates the vehicle control portion in the figure. The output of the determination portion 112 is inputted to the vehicle control portion 901.

A vehicle (following vehicle that travels to follow a preceding vehicle) that mounts the object detection device 1 is disposed behind the preceding vehicle to follow the preceding vehicle. In that case, the object detection device 1 detects a distance to, position of, and pose of the preceding vehicle as described above.

The vehicle control portion 901 receives the detection results by the determination portion 112 and controls unillustrated other vehicular devices based on the detection results. The control targets of the vehicle include a steering angle, a brake, and a steering device and are controlled to follow the preceding vehicle and travel based on the detected results. The vehicle control information is outputted from the object detection device 1 to the other unillustrated devices via an in-vehicle network such as CAN (Controller Area Network).

In case of a track control in which a short separation distance to the preceding vehicle is set, the preceding vehicle may overhang the capture view angle or turn to move out of the capture view angle. According to the object detection device 1 of the present embodiment, the distance to the preceding vehicle and the position and pose of the preceding vehicle can be continuously detected as mentioned above to safely follow the preceding vehicle.

It is noted that FIG. 10 illustrates the example that the vehicle control portion 901 and the object detection device 1 are housed in the same body, but this is not limiting. The vehicle control portion 901 and the object detection device 1 may be housed in different bodies and transfer the detection results via an in-vehicle network. As above, the image capture portion 101 and the image capture portion 102 may have different bodies.

Third Embodiment

Figure 11:
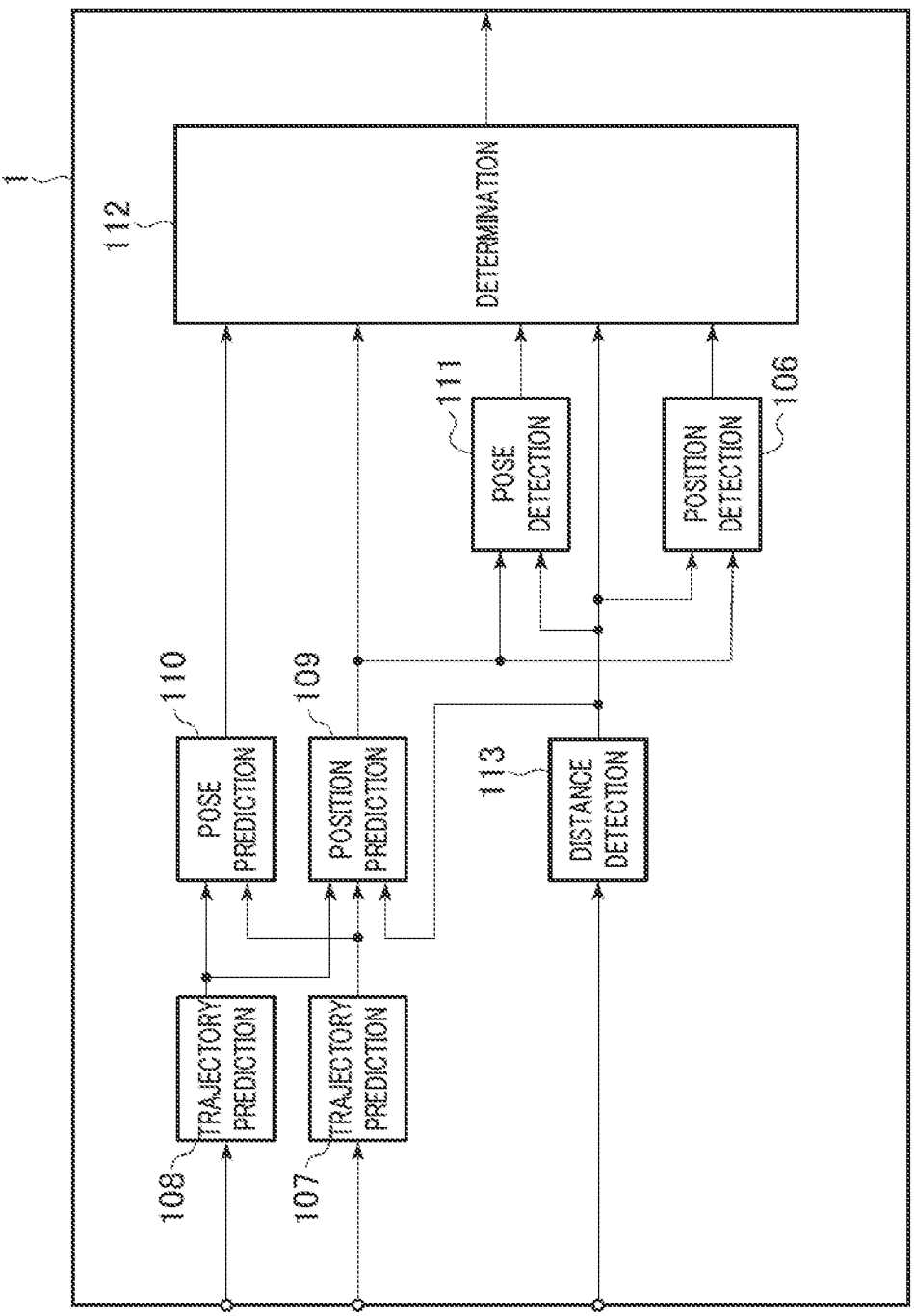
FIG. 11 illustrates a configuration of an object detection device of Third Embodiment.

FIG. 11 is a diagram illustrating a configuration of an object detection device of Third Embodiment of the present invention. The components that achieve the same functions as the components of FIG. 1 use the same reference signs as FIG. 1 and are not explained in detail. The present embodiment has a characteristic that object detections are made using a sensor configured using other than the image capture portion 101 and image capture portion 102 to acquire distance information and position information.

For example, the input information includes the information acquired from an unillustrated radar or a sensor such as an infrared sensor. A distance to and position of an object in a target range can be determined. The determination portion 112 changes a usage rate between the detection results of the position detection portion 106 and pose detection portion 111 and the prediction results of the position prediction portion 109 and pose prediction portion 110 in response to the range of the preceding vehicle within the detection area of the sensor. Further operation is as mentioned above.

Fourth Embodiment

Figure 12:
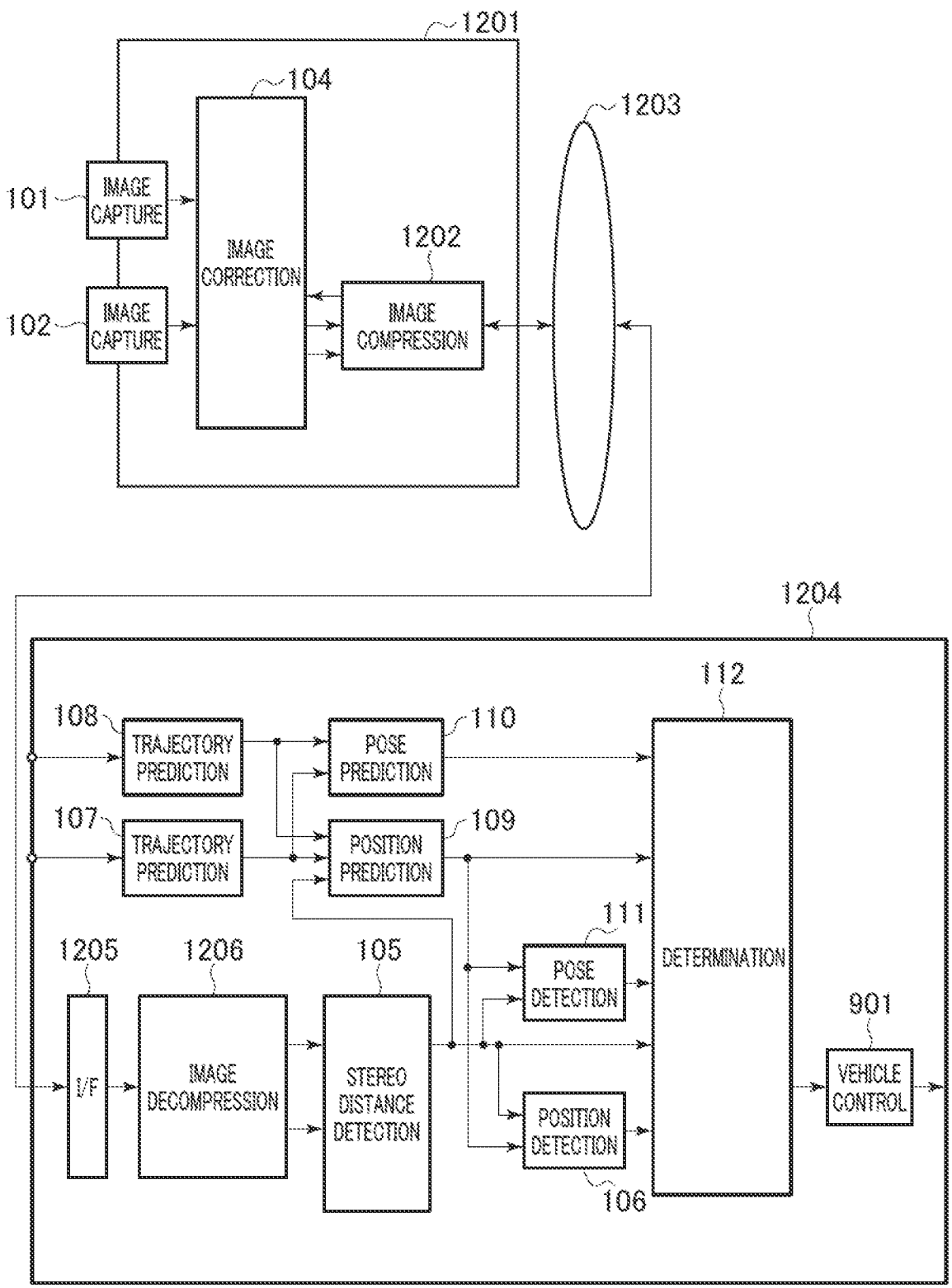
FIG. 12 illustrates a configuration of an object detection device of Fourth Embodiment.

FIG. 12 is a diagram illustrating a configuration of an object detection device of Fourth Embodiment. The components that achieve the same functions as the components of FIG. 1 use the same reference signs as FIG. 1 and are not explained in detail. A characteristic in the present embodiment is that an image capture portion 1201 and a control portion 1204 are provided to different bodies and connected to each other in communication with each other via a network.

A reference sign 1201 indicates a network image capture portion. A reference sign 1203 indicates an LAN (Local Area Network). A reference sign 1204 indicates a control portion. The network image capture portion 1201 is attached, for example, to a windshield of a vehicle. The control portion 1204 is housed in a body different from that for the network image capture portion 1201 and disposed at a place where space can be ensured in the vehicle. An LAN 1203 may use an in-vehicle network such as a CAN.

The network image capture portion 1201 is connected to the control portion 1204 via the LAN 1203. Additionally, a reference sign 1202 indicates an image compression interface portion. A reference sign 1205 indicates a network interface portion. A reference sign 1206 indicates an image decompression portion.

The image correction portion 104 executes brightness correction, lens distortion correction, and horizontal alignment for the images captured by the image capture portion 101 and image capture portion 102. Next, the image compression interface portion 1202 compresses an image from the image correction portion 104 and transmits the image to the control portion 1204 via the LAN 1203. The image compression method includes an intra-screen compression method to execute compression in one image to reduce a processing time without using temporal correlation of multiple images. Additionally, selection of and switching to video compression encoding may be made.

The image compression interface portion 1202 generates compressed encoded data and transmits the data in accordance with a predetermined network protocol. It is noted that the image correction portion 104 may be provided after the image extension portion 1206 of the control portion 1204. The image correction portion 104 executes processing before the image compression interface portion 1202 of the network image capture portion 1201 to execute image compression after correcting lens distortion etc. Highly efficient image compression and image enhancement are thus expected.

In the control portion 1204, the network interface portion 1205 receives compressed image data via the LAN 1203. The compressed image data received by the network interface portion 1205 of the control portion 1204 is decompressed to the original image in the image extension portion 1206 and the distance is detected by the stereo distance detection portion 105. Further processing is as mentioned above.

According to the present embodiment, compressed images are transmitted via the LAN 1203. The processing amount in the image capture portions can be reduced. Because of weight reduction, power consumption reduction, and body size reduction of the image capture portions, size restriction can be reduced in installation of the image capture portions to a vehicle. When a transmission bandwidth of a network is efficiently ensured, the transmission is possible without image compression and decompression.

It is noted that the present invention is not limited to the above embodiments and includes various modifications. For example, the above embodiments have been explained in detail for understandable explanation of the present invention. The above embodiments are not limited to ones provided with all the explained configurations. Additionally, it is possible to replace part of a configuration of a certain embodiment with a configuration of another embodiment. It is also possible to add part of a configuration of a certain embodiment to a configuration of another embodiment. Additionally, it is possible to execute addition, deletion, and replacement for part of a configuration of each embodiment by using another configuration.

Additionally, part or all of each above configuration may include hardware or may be realized by executing a program using a processor. Additionally, the control lines and information lines considered to be required for explanation are illustrated. All the control lines and information lines are not necessarily illustrated for a product. In actual, generally all the configurations may be considered to be connected to each other.

LIST OF REFERENCE SIGNS 1 object detection device
101 to 102 image capture portion
104 image correction portion
105 stereo distance detection portion
106 position detection portion
107 to 108 trajectory prediction portion (first vehicle information input portion, second vehicle information input portion)
109 position prediction portion
110 pose prediction portion
111 pose detection portion
112 determination portion
201, 209 common image capture area
202 to 205 subject
301 to 305 processing area
901 vehicle control portion
1201 network image capture portion
1202 image compression interface portion
1203 LAN
1204 control portion
1205 network interface portion
1206 image decompression portion

The invention claimed is:

1. An object detection device comprising:
a distance detection portion that detects a distance to an object;
a position detection portion that detects a position of the object based on the distance detected by the distance detection portion;
a pose detection portion that detects a pose of the object based on the distance detected by the distance detection portion;
a first vehicle information input portion that inputs state information about a host vehicle;
a second vehicle information input portion that inputs state information about a different vehicle;
a position prediction portion that predicts a position of the different vehicle based on the state information about the host vehicle and the state information about the different vehicle respectively inputted by the first vehicle information input portion and the second vehicle information input portion;
a pose prediction portion that predicts a pose of the different vehicle based on the state information about the host vehicle and the state information about the different vehicle respectively inputted by the first vehicle information input portion and the second vehicle information input portion;
a determination portion that determines a distance to, a position of, and a pose of the different vehicle based on information detected or predicted respectively by the distance detection portion, the position detection portion, the pose detection portion, the position prediction portion, and the pose prediction portion; and
an image capture portion that captures an image of the object;
wherein the determination portion determines a rate of using detection results detected by the distance detection portion, the position detection portion, and the pose detection portion and prediction results predicted by the position prediction portion and the pose prediction portion based on a range of the object appearing in the captured image captured by the image capture portion.

2. An object detection device according to claim 1 wherein
the determination portion applies lower weighting to detection values detected by the distance detection portion, the position detection portion, and the pose detection portion in response to reduction of the range of the object appearing in the captured image, and applies higher weighting to prediction values predicted by the position prediction portion and the pose prediction portion.

3. An object detection device according to claim 1 wherein
the image capture portion has a first image capture portion and a second image capture portion that are paired with each other to capture an image of a common image capture area, and
the distance detection portion detects a distance to the object based on a parallax acquired from images acquired by the first image capture portion and the second image capture portion.

4. An object detection device according to claim 1 wherein
the second vehicle information input portion acquires the state information about the different vehicle by intervehicle communications.

5. An object detection device according to claim 1 wherein
based on a distance detected by the distance detection portion, the position prediction portion detects a specific part of the object, and
the position detection portion and the pose detection portion detect a position and pose of a trailing surface of the object from the specific part of the object, the specific part being predicted by the position prediction portion.

6. A travel control system that controls travel of a host vehicle following a different vehicle,
the host vehicle comprising:
a distance detection portion that detects a distance between the host vehicle and the different vehicle;
a position detection portion that detects a position of the different vehicle based on a distance detected by the distance detection portion;
a pose detection portion that detects a pose of the different vehicle based on the distance detected by the distance detection portion;
a first vehicle information input portion that inputs state information about the host vehicle;
a second vehicle information input portion that inputs state information about the different vehicle;
a position prediction portion that predicts a position of the different vehicle based on the state information about the host vehicle, the state information about the host vehicle being inputted by the first vehicle information input portion, and based on the state information about the different vehicle, the state information about the different vehicle being inputted by the second vehicle information input portion;
a pose prediction portion that predicts a pose of the different vehicle based on the state information about the host vehicle, the state information about the host vehicle being inputted by the first vehicle information input portion, and based on the state information about the different vehicle, the state information about the different vehicle being inputted by the second vehicle information input portion;
a determination portion that determines a distance to, a position of, and a pose of the different vehicle in response to information detected or predicted respectively by the distance detection portion, the position detection portion, the pose detection portion, the position prediction portion, and the pose prediction portion;
a control portion that executes travel control to make the host vehicle follow the different vehicle; and
an image capture portion that captures an image of the different vehicle;
wherein the determination portion determines a rate of using detection results detected by the distance detection portion, the position detection portion, and the pose detection portion and prediction results predicted by the position prediction portion and the pose prediction portion based on a range of the different vehicle appearing in the captured image captured by the image capture portion.

7. A travel control method of controlling travel of a host vehicle following a different vehicle comprising:
a step of detecting a distance between the host vehicle and the different vehicle;
a step of detecting a position of the different vehicle based on the detected distance;
a step of detecting a pose of the different vehicle based on the detected distance;
a step of inputting state information about the host vehicle;
a step of inputting state information about the different vehicle;
a step of predicting a position of the different vehicle based on the state information about the host vehicle and the state information about the different vehicle;
a step of predicting a pose of the different vehicle based on the state information about the host vehicle and the state information about the different vehicle;
a step of determining a distance to, a position of, and a pose of the different vehicle in response to the detected distance, the detected position, and the detected pose and in response to the predicted position and the predicted pose; and
a step of executing travel control to make the host vehicle follow the different vehicle based on a determined result; and
a step of capturing an image of the different vehicle;
wherein the step of determining determines a rate of using the detected distance, the detected position, and the detected pose and a rate of using the predicted position and the predicted pose based on a range of the different vehicle appearing in the captured image.

8. An object detection device comprising:
a distance detection portion that detects a distance to an object;
a position detection portion that detects a position of the object based on the distance detected by the distance detection portion;
a pose detection portion that detects a pose of the object based on the distance detected by the distance detection portion;
a first vehicle information input portion that inputs state information about a host vehicle;
a second vehicle information input portion that inputs state information about a different vehicle;
a position prediction portion that predicts a position of the different vehicle based on the state information about the host vehicle and the state information about the different vehicle respectively inputted by the first vehicle information input portion and the second vehicle information input portion;
a pose prediction portion that predicts a pose of the different vehicle based on the state information about the host vehicle and the state information about the different vehicle respectively inputted by the first vehicle information input portion and the second vehicle information input portion; and
a determination portion that determines a distance to, a position of, and a pose of the different vehicle based on information detected or predicted respectively by the distance detection portion, the position detection portion, the pose detection portion, the position prediction portion, and the pose prediction portion;
wherein the determination portion uses detection results of the distance detection portion, the position detection portion, and the pose detection portion when a position detected by the position detection portion is within a predetermined range.

9. An object detection device comprising:
a distance detection portion that detects a distance to an object;
a position detection portion that detects a position of the object based on the distance detected by the distance detection portion;
a pose detection portion that detects a pose of the object based on the distance detected by the distance detection portion;
a first vehicle information input portion that inputs state information about a host vehicle;
a second vehicle information input portion that inputs state information about a different vehicle;
a position prediction portion that predicts a position of the different vehicle based on the state information about the host vehicle and the state information about the different vehicle respectively inputted by the first vehicle information input portion and the second vehicle information input portion;
a pose prediction portion that predicts a pose of the different vehicle based on the state information about the host vehicle and the state information about the different vehicle respectively inputted by the first vehicle information input portion and the second vehicle information input portion; and
a determination portion that determines a distance to, a position of, and a pose of the different vehicle based on information detected or predicted respectively by the distance detection portion, the position detection portion, the pose detection portion, the position prediction portion, and the pose prediction portion;
wherein the determination portion uses prediction results of the position prediction portion and the pose prediction portion when a position detected by the position detection portion is outside a predetermined range.

* * * * *